United States Patent Office.

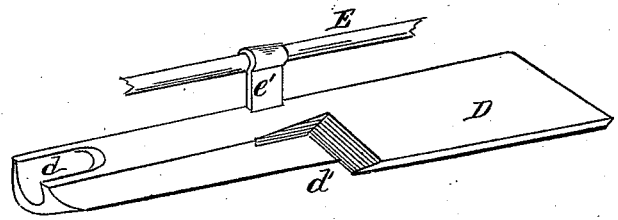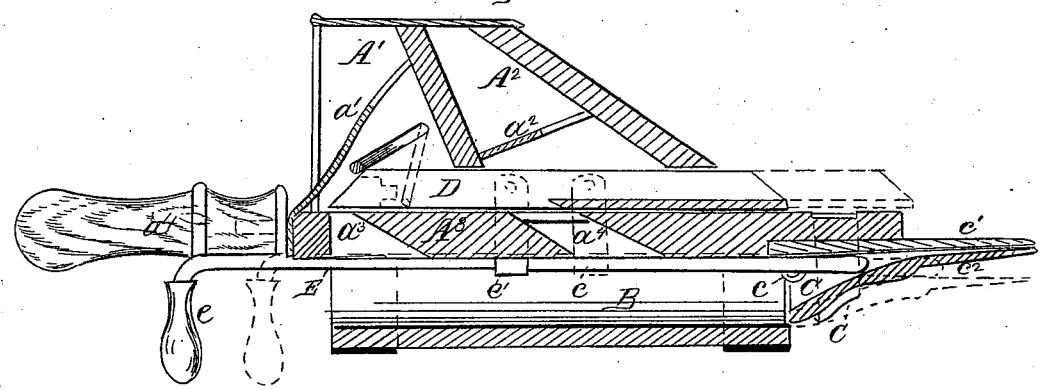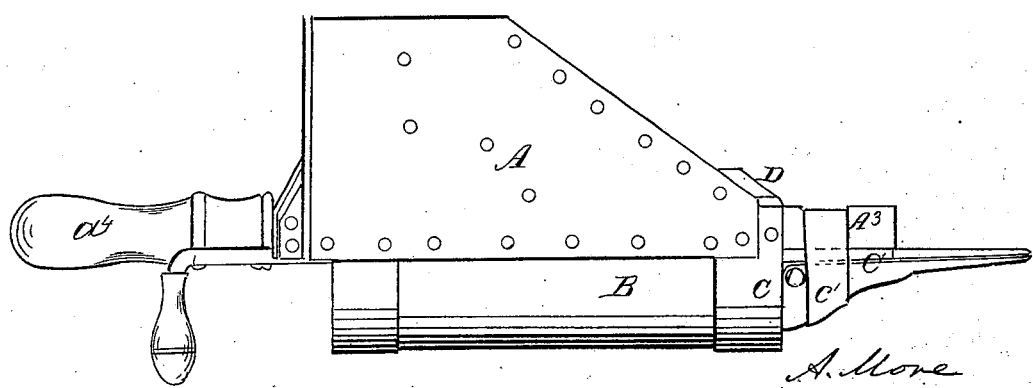

ALBERT MORE, OF MORESVILLE, NEW YORK.

Letters Patent No. 92,632, dated July 13, 1869.

IMPROVEMENT IN HAND SEED-PLANTER.

The Schedule referred to in these Letters Patent and making part of the same.

*To all whom it may concern:*

Be it known that I, ALBERT MORE, of Moresville, in the county of Delaware, and State of New York, have invented a new and useful Improvement in Hand Seed-Planters; and I do hereby declare that the following is a full, clear, and exact description thereof, reference being had to the accompanying drawings, and to the letters of reference marked thereon.

Figure 1 represents an elevation of the planter;

Figure 2, a vertical section of the same, the red lines indicating the position of the hinged lip of the drill and that of the seed-rod, when the seed is deposited in the ground; and Figure 3, a perspective view of the seed-rod or slide.

The nature of my invention consists in improvements in the construction of seed-planters, and novel devices for operating the same, as more fully described hereinafter.

To enable those skilled in the art to make and use my invention, I will proceed to describe its construction and operation.

A represents the combined seed-boxes $A^1$ and $A^2$, the inner side of which is formed by the flat portion of staff $A^3$. The upper box $A^1$ is made about twice the size of the lower one, and large enough to hold about one quart of corn. The bottoms of the two boxes are inclined toward the inner side, as clearly shown in fig. 2 of the drawings.

They are provided with diagonal partitions $a^1$ and $a^2$, open at their lower ends, which serve to hold the main portion of the seed in the upper part of the respective boxes, allowing only enough to slide down the inclined bottoms at a time, to load the cups of the seed-rod.

By this arrangement, the movements of the seed-rod D are left unobstructed, and seed cannot enter the funnels $a^3$ and $a^4$, unless it is carried up to them in the cups of the seed-rod.

The upper box, which is arranged for corn, is provided with a hinged scraper, $a$, which slides over the bevelled end of the seed-rod, and scrapes off any corn that may have heaped on it.

$A^3$ represents the staff, which is about four feet long, and is, at its upper end, provided with a handle, $a^5$. Where the seed-boxes are fastened to it, it is made flat, and forms the inner side of such boxes, as above stated.

The sloping holes $a^3$ and $a^4$, in this part of the staff, serve as conductors, or funnels, through which the seed is conducted to the spout B.

This flat portion of the staff has a long slot on one side, in which the connecting piece $e'$ works up and down.

B represents the semicircular spout, through which the seed is conducted into the drill C. It is fastened to the flat portion of the staff, enclosing the funnels $a^3$ and $a^4$.

C represents the flat drill. It consists of two parts or lips, $C^1$ and $C^2$. $C^1$ is a flat, straight piece of iron or other metal, fastened to the staff directly under the spout, and has at its upper end two lugs, $c\ c$, one on each edge, on which the lip $C^2$ is hinged. The lower end of this latter lip is straight, and lies flat against $C^1$, but its upper part is bulged, so as to form a continuation of the spout. The lower flat end of the lip $C^2$ is held to the lip $C^1$ by an elastic band or spring, $c'$.

D represents the seed-rod or slide, of the form clearly shown in fig. 3 of the drawings. It slides up and down on the inner side of the seed-boxes, through openings in their respective bottoms, in which openings it is nicely fitted.

It has two open cups, or chambers, $d$ and $d'$, and that side of it which presents the open sides of these cups, lies on that side of the boxes that has the funnels.

E represents the plunger, which is about three feet long, and has at its upper end a handle, $e$. It is connected with the seed-rod by the connecting piece $e'$. By this plunger two functions are performed: the seed-rod is moved up and down by it, and the lips of the drill are opened by forcing its lower end between them to drop the seed.

The operation is as follows:

The operator takes hold by the handle of the staff with one hand, and pushes the plunger down with the other, until the seed-rod is in the position indicated by the red lines in fig. 2, when some of the seed will fall into and fill the cup or cups of the seed-rod.

The plunger is then drawn up until the open sides of the cups holding the seed are opposite the funnel in the flat portion of the staff, through which it falls into the spout and open end of the drill. The drill is then pushed into the ground a sufficient depth, when the lips are opened, to drop the seed, by forcing the plunger down between them. At the same time the seed-rod, being fastened to the plunger, is pushed down, and one or both of its cups loaded with seed. The plunger is again drawn up, the lips of the drill closed by the action of the elastic band or spring, and another cupful of seed discharged into the spout and open end of the drill, ready to be deposited in the next hill.

The apparatus, as shown and described, is arranged to plant corn from the upper box, and pumpkin-seed from the lower; but it will readily be seen, that by slight alterations it can be arranged to plant potatoes, beans, sorghum, or any seed which may be planted in hills.

It is apparent that by the arrangement of double seed-boxes and a double-chambered seed-rod or slide, two kinds of seed may be planted at the same time and in the same hills.

I contemplate connecting planters of the above-described construction to the necessary machinery, and work them by horse or other power.

Some of the advantages of this seed-planter over others consist in its cheapness of construction, that it will plant in stony ground, where it is almost impossible to use a hoe; and that it never fails to drop the seed.

Having thus described my invention,

What I claim, and desire to secure by Letters Patent, is—

1. The construction of the double-chambered seed-rod, or slide D, substantially as and for the purpose set forth.

2. The combination and arrangement of the seed-boxes $A^1$ and $A^2$, and double-chambered slide D, substantially as and for the purpose set forth.

3. The combination of the plunger E, lips $C^1$ and $C^2$ of the drill C, and elastic band, or spring $c'$, substantially as and for the purpose set forth.

4. The arrangement of the partitions $a^1$ and $a^2$, with reference to the inclined bottoms of the seed-boxes and the double-chambered slide D, substantially as shown and described.

5. The arrangement of the scraper $a$, with reference to the double-chambered slide D, substantially as and for the purpose set forth.

6. The combination and arrangement of the seed-boxes $A^1$ and $A^2$, double-chambered slide D, and spout B, substantially as and for the purpose set forth.

In testimony whereof, I have signed my name to this specification, in the presence of two subscribing witnesses.

ALBERT MORE.

Witnesses:
B. I. MORE,
I. C. PORN.